(12) United States Patent
Mack et al.

(10) Patent No.: US 7,257,147 B1
(45) Date of Patent: Aug. 14, 2007

(54) ENCODING VITERBI ERROR STATES INTO SINGLE CHIP SEQUENCES

(75) Inventors: Robert W. E. Mack, Sunnyvale, CA (US); Paul F. Beard, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 838 days.

(21) Appl. No.: 10/324,990

(22) Filed: Dec. 20, 2002

(51) Int. Cl.
H04B 1/00 (2006.01)
(52) U.S. Cl. ........................ 375/142; 375/150; 370/335
(58) Field of Classification Search .............. 375/142, 375/150; 370/335, 342
See application file for complete search history.

(56) References Cited

U.S. PATENT DOCUMENTS

| | | | | |
|---|---|---|---|---|
| 5,555,268 | A * | 9/1996 | Fattouche et al. | 375/141 |
| 6,072,787 | A * | 6/2000 | Hamalainen et al. | 370/335 |
| 6,449,266 | B1 * | 9/2002 | Hottinen et al. | 370/342 |
| 6,614,776 | B1 * | 9/2003 | Proctor, Jr. | 370/342 |

OTHER PUBLICATIONS

Tzi-Dar Chiueh, "Trellis-coded complementary code keying for high-rate wireless LAN systems", IEEE Communications Letters, vol. 5, Issue 5, May 2001 pp. 191-193.*
Spread Spectrum Wireless Technology, White Paper. Sep. 2000, v1.0 Copyright Wi-LAN Inc., Alberta, Canada.
A Tutorial on Convolutional Coding with Viterbi Decoding, 1999—2002, updated Jul. 5, 2002, Spectrum Applications [retrieved on Oct. 1, 2002]. Retrieved from the internet: URL:http//home.netcom.com/chip.f/viterbi/tutorial.html.
WISSCE Communications Systems. Spread Spectrum Techniques, Aug. 29, 1996 [retrieved on Oct. 8, 2002]. Retrieved from the internet:URL:http://cas.el.tudelf1.n1/glas/ssc/techn/techniques.html.
Processing Gain for Direct Sequence Spread Spectrum Communication System and PRISM, Aug. 1996, Application Note 9633. Copyright Intersil Americas Inc. 2001.
Spread Spectrum Wireless System Fundamentals, Wireless fundamentals [retrieved on Oct. 8, 2002]. Retrieved from the internet: URL:http//www.xsilogy.com/corporate/support/guides/wireless_fundamentals.html>.
TechEncyclopedia, TechWeb: The Business Technology Network; Copyright 1981-2002 The Computer Language Company [retrieved on Oct. 8, 2002]. Retrieved from the internet: URL:http//www.techweb.com/encyclopedia/defineterm?term=cdma&x=0&y=0.html>.

(Continued)

Primary Examiner—Temesghen Ghebretinsae
Assistant Examiner—Juan Alberto Torres
(74) Attorney, Agent, or Firm—Okamoto & Benedicto LLP

(57) ABSTRACT

A technique for receiving an error state in a single chip sequence in a wireless communications network is disclosed. The error state may comprise a Viterbi error state. The error state may be identified as a target code encoded in the single chip sequence, the target code comprising either a code or the complement of the code. The code may comprise a PN-Code. The error state may be identified using a previous mapping of error states from a set of error states to a group of codes, the group of codes comprising a plurality of codes and their complements. The error states in the set of error states in the previous mapping may be uniquely mapped to plurality of codes and their complements in the group of codes.

7 Claims, 7 Drawing Sheets

OTHER PUBLICATIONS

Spread Spectrum: Basic Concepts and Applications, P1: Spread Spectrum Communications, Republished Courtesy of www.TechOnline.com [retrieved on Oct. 8, 2002]. Retrieved from the internet: URL:http//www.xsilogy.com/corporate/support/guides/spread_spectrum.html>.

Spread Spectrum: Codes, Processing Gain, and Synchronization, Wireless Fundamentals: Republished Courtesy of www.TechOnline.com [retrieved on Oct. 8, 2002]. Retrieved from the internet: http://www.xsilogy.com/corporate/support/guides/codes.html>.

* cited by examiner

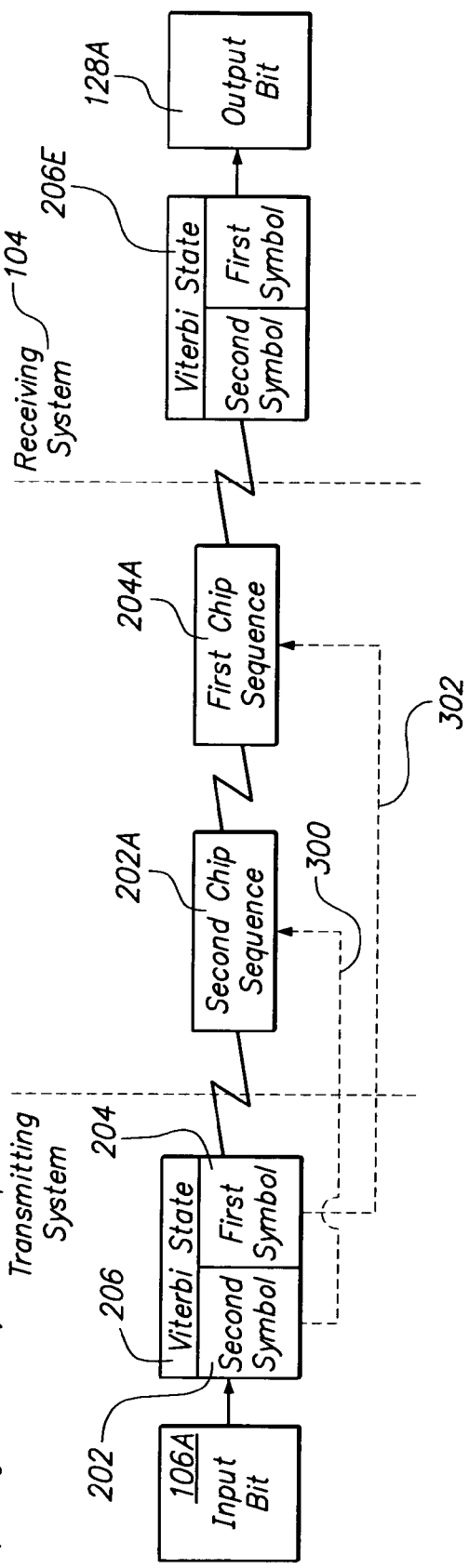
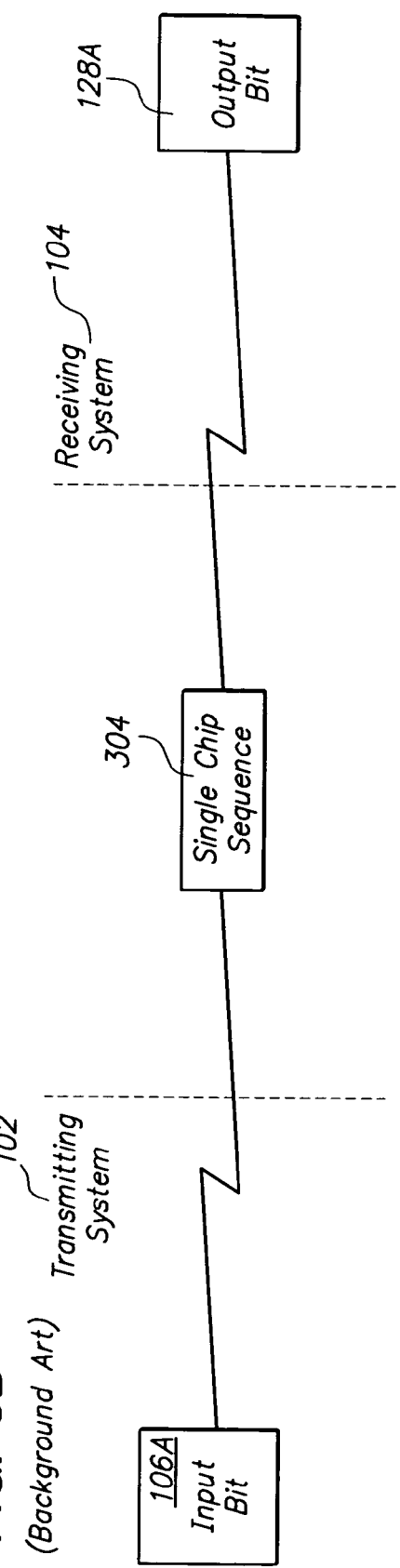
FIG. 3A
(Background Art)
FIG. 3B
(Background Art)

ENCODING VITERBI ERROR STATES INTO SINGLE CHIP SEQUENCES

BACKGROUND OF THE INVENTION

1. Field of the Invention

The present invention relates generally to wireless communication networks, and more particularly to error-checking of data transmissions.

2. Description of the Background Art

Spread spectrum wireless communication systems use a type of modulation that spreads data transmission across an available frequency band in excess of the minimum bandwidth required to send the information. Direct Sequence Spread Spectrum ("DSSS") is the most widely recognized form of spread spectrum. One of the unique benefits of DSSS techniques is that multiple data transmissions—being distinguishable by uniquely assigned codes—can share the same bandwidth (i.e., can be transmitted over the same frequency at the same time). An application of this technology—Code Division Multiple Access ("CDMA")—is prevalent in the cellular telephone industry.

DSSS systems incur random transmission errors caused by, among other things, noise and interference. As a result, DSSS systems typically incorporate error-correction techniques—such as Forward Error Correction ("FEC") techniques—for detecting and correcting transmission errors. One of the most common FEC techniques uses the Viterbi error-correction algorithm well known in the art (hereafter "Viterbi error-checking"). In Viterbi error-checking, a convolutional encoder (hereafter "Viterbi encoder") in the transmitting system encodes the input data stream into Viterbi error states. The Viterbi error states are then decoded in the receiving system using a Viterbi decoder for detection and correction of transmission errors.

SUMMARY

A technique for performing error-correction in a wireless communications network includes receiving an error state in a single chip sequence. The error state may comprise a Viterbi error state. The error state may be identified as a target code encoded in the single chip sequence, the target code comprising either a code or the complement of the code. The code may comprise a PN-Code. The error state may be identified using a previous mapping of error states from a set of error states to a group of codes, the group of codes comprising a plurality of codes and their complements. The error states in the set of error states in the previous mapping may be uniquely mapped to a plurality of codes and their complements in the group of codes.

These and other features of the present invention will be readily apparent to persons of ordinary skill in the art upon reading the entirety of this disclosure, which includes the accompanying drawings and claims.

DESCRIPTION OF THE DRAWINGS

FIGS. 3A-3B are block diagrams illustrating the bandwidth requirements of a conventional DSSS system 100 with and without Viterbi error-checking.

The use of the same reference label in different drawings indicates the same or like components. Drawings are not to scale unless otherwise noted.

DETAILED DESCRIPTION

In the present disclosure, numerous specific details are provided such as examples of apparatus, components, and methods to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
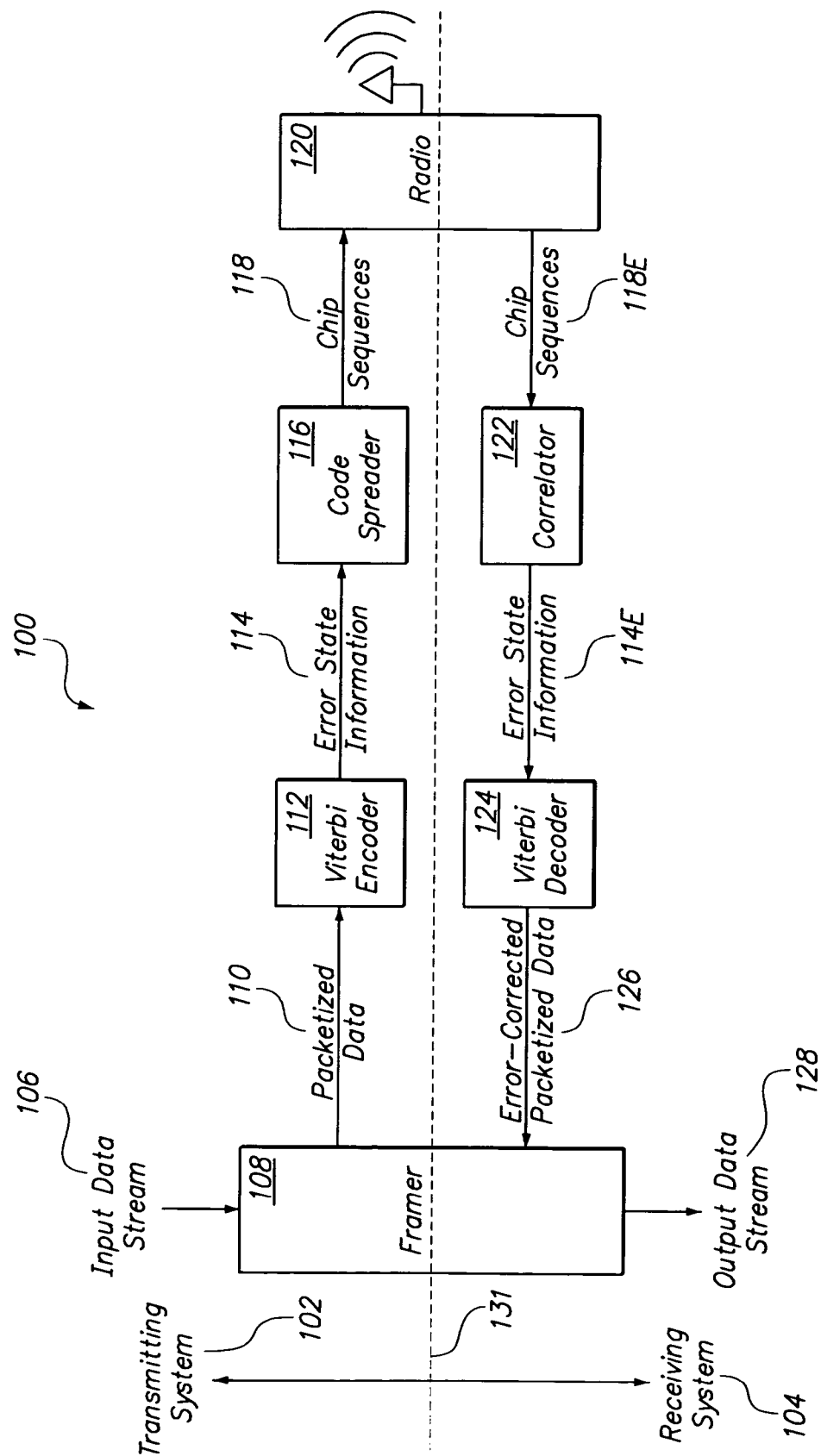
FIG. 1 is a block diagram illustrating data flow in a conventional DSSS system 100 using conventional Viterbi error-correction.

FIG. 1 is a block diagram illustrating data flow in a conventional DSSS system 100 using conventional Viterbi error-correction. DSSS system 100 includes both a transmitting system 102 and a receiving system 104 (transmitting system 102 is demarcated from receiving system 104 by dotted line 131). Transmitting system 102 and receiving system 104 may be integrated in the same apparatus, or separately built into more specialized communication devices (e.g., receiver-only or transmitter-only devices). Receiving system 104 includes a framer 108, a convolutional encoder (hereafter referred to as a Viterbi encoder) 112, a code spreader 116, and radio transmitter 120. Input data stream 106, for example a digitized voice stream, enters the transmitting system 102 via framer 108. Framer 108 packetizes the input data stream 106 according to a predetermined communication format (application dependent) into packetized data 110 for transmission.

Packetized data 110 is encoded by Viterbi encoder 112 into Viterbi error state information 114, also known as channel symbols. Each channel symbol includes one bit of information used to identify a Viterbi error state; Viterbi error states generally include two or more channel symbols. Each channel symbol is then multiplied and spread across a designated available spectrum with a noise-like code called a pseudorandom noise sequence ("PN-code") by code spreader 116. Each bit of the PN-code is called a chip, and the sequence of bits constituting a PN-code is called a chip sequence. Sixty-four bits is a commonly used chip sequence length (PN-code length), and thus code spreader 116 typically applies a phase-varying modulation technique in which the chips are transmitted at a much higher rate than the data that they encode. Typically, the PN-code is used to transmit binary error state information 114 in the following manner: transmission of the PN-code itself denotes a binary one, and transmission of the complement of the PN-code denotes a binary zero. Chip sequences 118—where each chip sequence 118 encodes a single bit of error state information 114 (e.g., a channel symbol 202 or 204)—are transmitted by radio transmitter 120 to receiving system 104.

Receiving system 104 receives chip sequences 118E via radio transmitter 120. (The use of the letter "E" after a reference numeral in this disclosure is intended to indicate that the data received in the receiving system 104 may not be equivalent to the corresponding data in the transmitting system 102 due to transmission errors. Thus, the chip sequences 118E received by the receiving system 104 may include transmission errors not present in the chip sequences 118 originally transmitted by the transmitting system 102). Correlator 122 is programmed to listen for a specific PN-code (or its complement) in the chip sequences 118. Correlator 122 listens for chip sequences by receiving individual chips and tallying the chip values for determination of whether a match with the pre-programmed PN-Code (and PN-code complement) is encountered. If the correlator 122 encounters a PN-code (or PN-code complement) match, correlator 122 outputs one bit of error state information 114E whose value typically corresponds to whether the PN-code (a binary one) or its complement (a binary zero) is matched. Error state information 114E is then input to Viterbi decoder 124. The Viterbi decoder 124 proceeds to detect and correct errors in the error state information 114E according to the Viterbi error-correction algorithm. Viterbi decoder 124 thus outputs error-corrected packetized data 126 for input to framer 108. Framer 108 depacketizes the error-corrected packetized data 126 into output data stream 128, which generally corresponds to the original input data stream 106 after error detection and correction.

Figure 2:
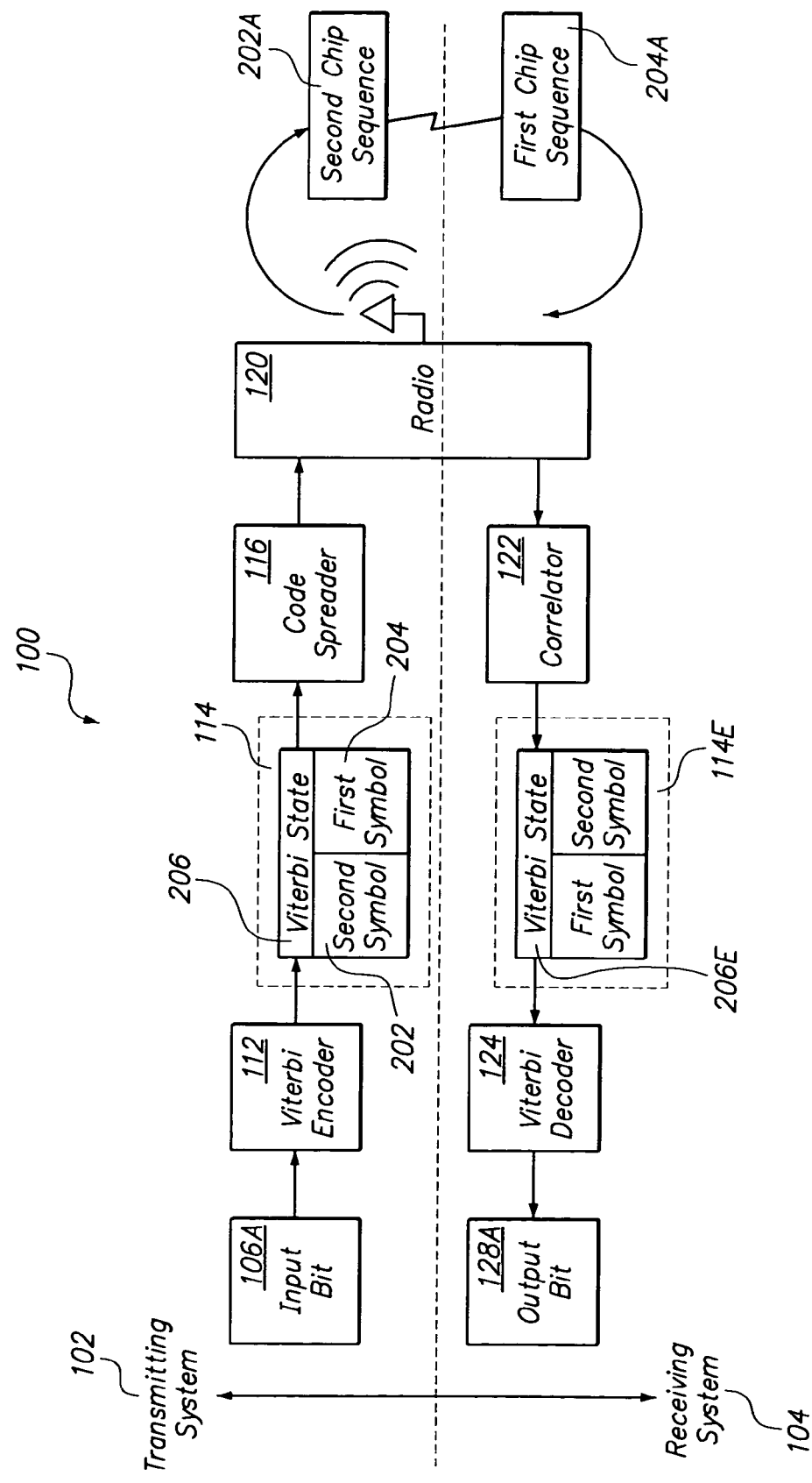
FIG. 2 is a block diagram illustrating in more detail the Viterbi error-correction processes and bandwidth requirements of conventional DSSS system 100 of FIG. 1.

FIG. 2 is a block diagram illustrating in more detail Viterbi error-correction processes and bandwidth requirements in respect to the processing of one bit of data (hereafter "input bit") 106A from input data stream 106 in the conventional DSSS system 100 of FIG. 1. In FIG. 2, the error state information 114 generated by Viterbi encoder 112 for each input bit 106A includes two symbols (each symbol equal to a single bit): a first symbol 204 and a second symbol 202, which together comprise a Viterbi error state 206. The ratio of the number of input bits 106A to the number of output symbols (bits) 202 and 204 is known as the code rate of the Viterbi encoder 112. A code rate of ½—meaning that each input bit 106A is encoded into two channel symbols 202 and 204 (the Viterbi error state 206)—is commonly used in the art. Viterbi encoder 112 doubles the input data (each input bit 106A is encoded into two symbols 202-204) in order to add redundancy (among other things) to the input data stream 106 for use in error-correction by the Viterbi decoder 124. Each two bit Viterbi error state 206 represents one of four states used by the Viterbi decoder for purposes of detecting and correcting errors in the input data stream 106.

The code rate of the Viterbi encoder 112 is important because it largely determines the bandwidth requirements of DSSS systems 100 using Viterbi error-detection. In DSSS system 100, for example, the use of Viterbi error-correction at a code rate of ½ results in a bandwidth penalty generally equal to double the data rate. This bandwidth penalty arises because for each input bit 106A, two bits corresponding to the Viterbi error state 206 (symbols 204 and 202) must be separately spread (using a PN-code) and transmitted in two chip sequences 204A and 202A respectively. This situation is illustrated in FIG. 3A, where input bit 106A is converted to Viterbi error state 206 by Viterbi encoder (not shown), and then transmitted as two chips sequences: a first chip sequence 204A encoding the first symbol 204 (dotted line 300) of the Viterbi error state 206, and a second chip sequence 202A encoding the second symbol 202 of the Viterbi error state 206 (dotted line 302). Absent the use of Viterbi error-checking, each input bit 106A could be transmitted using a single chip sequence 304, as illustrated in FIG. 3B, thereby halving the bandwidth from two chip sequences, e.g., 202A-204A, to a single chip sequence 304.

Figure 4A:
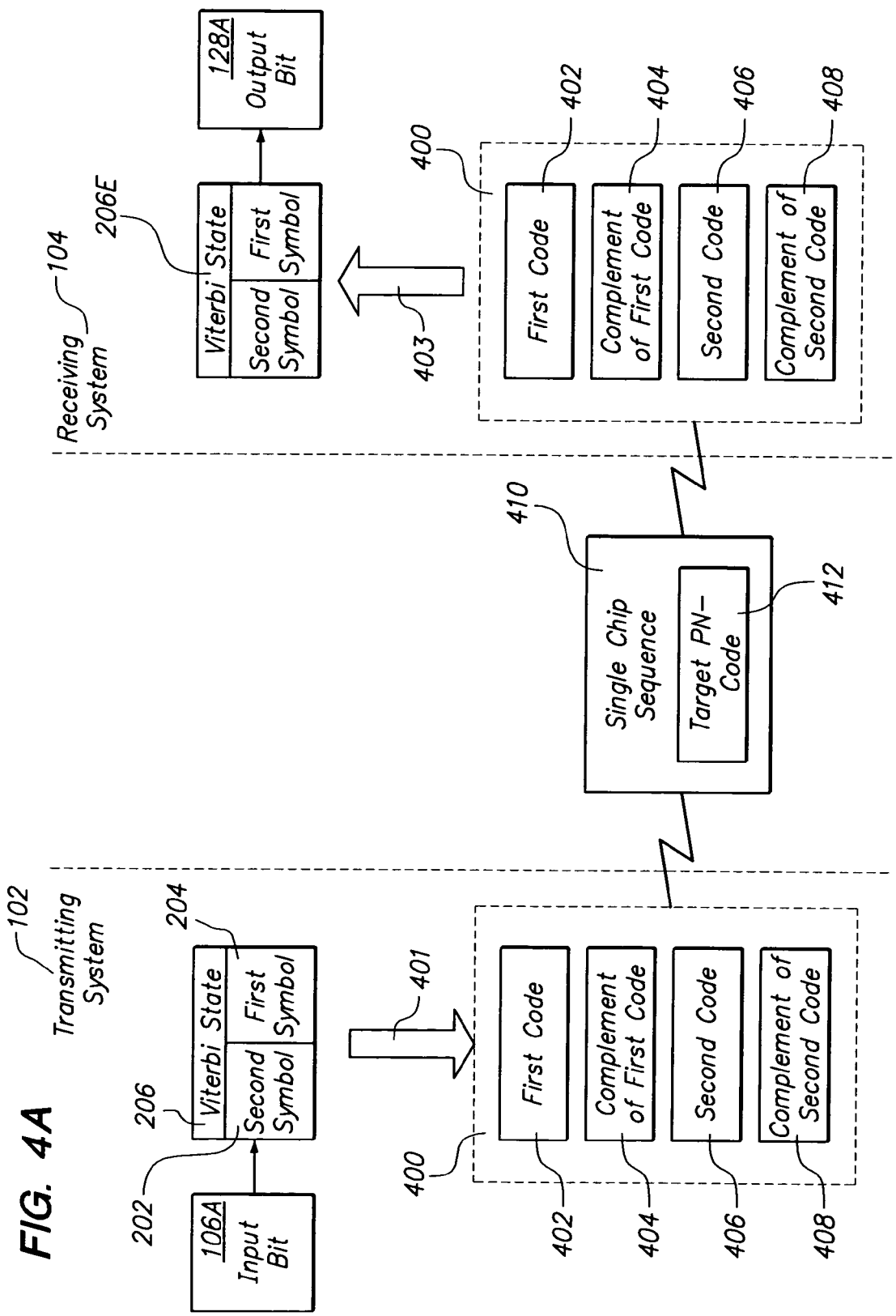
FIG. 4A is a block diagram illustrating data flow in a DSSS System that enables the use of Viterbi error-correction without the Viterbi-related bandwidth penalty, according to some embodiments of the present invention.
Figure 4B:
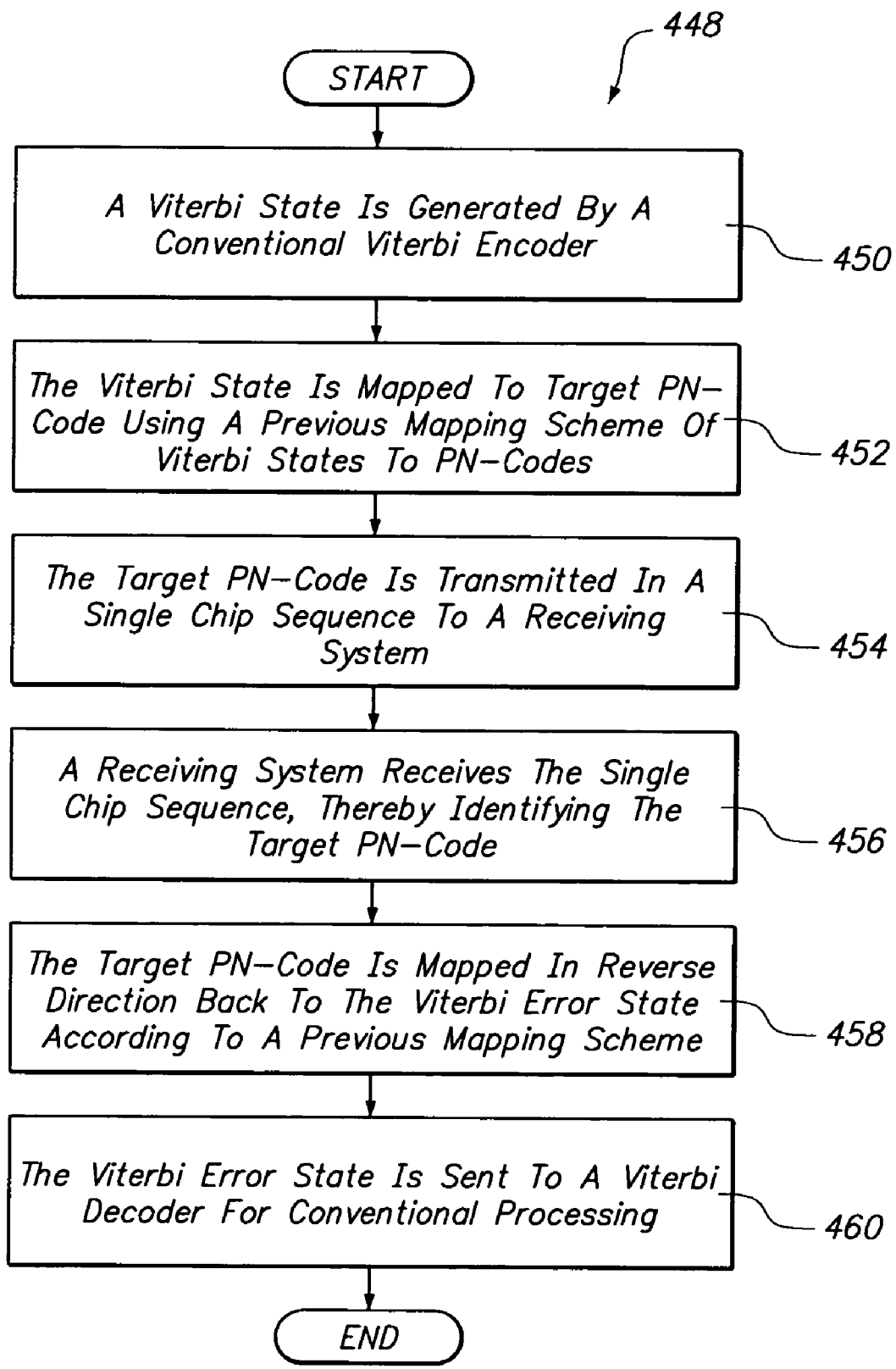
FIG. 4B is a flow chart illustrating a method of using Viterbi error-checking without Viterbi-related bandwidth penalty, according to some embodiments of the present invention.

FIG. 4A is a block diagram illustrating data flow in a modified DSSS system that enables the use of Viterbi error-correction without the Viterbi-related bandwidth penalty, according to some embodiments of the present invention. FIG. 4A will be described using the flow chart of FIG. 4B. FIG. 4B illustrates a method 448 of using Viterbi error-checking without the aforementioned Viterbi-related bandwidth penalty, according to some embodiments of the present invention. The following embodiments are described for a Viterbi coding rate of ½ (i.e., a 2 bit Viterbi error state), although those skilled in the art will recognize after reading this disclosure that the principles and teachings disclosed herein may be extended using ordinary skill to Viterbi error states longer than 2 bits, and thus code rates in excess of ½, and that the present invention is accordingly to be limited solely by the language of its claims.

Turning to the flow diagram of FIG. 4B, in step 450, Viterbi decoder 112 (not shown in FIG. 4A) in transmitting system 102 receives input bit 106A and generates a Viterbi error state 206; the Viterbi error state 206 includes a first symbol 204 and a second symbol 202 (in the case of a code rate equal to ½).

In step 452, the Viterbi error state 206 is mapped 401 to a single PN-code 402, 406 or PN-code complement 404, 408 (hereafter, "target PN-code") within a group 410 of the PN-codes 402, 406 and PN-code complements 404, 408 (hereafter "PN-code group"). In FIG. 4A, for example, PN-code group 400 includes a first PN-code 402, the complement 404 of the first PN-code 402, a second PN-code 406, and the complement 408 of the second PN-code 406; the Viterbi error state 206 is thus mapped 401 to a target PN-code which includes either PN-codes 402 or 406 or one of their complements 404 or 408. The mapping 401 performed in step 452 follows a pre-determined mapping scheme such as those described in reference to FIGS. 5A-5B below (e.g., mapping schemes 530-532).

In step 454, the target PN-code 412 is transmitted in a single chip sequence 410. Transmission of the Viterbi error state 206 using a single chip sequence 410 thus removes the penalty associated with requiring multiple chip sequences using the same PN-code to transmit the multiple bits of the Viterbi error state 206 in conventional systems.

In step 456, the receiving system 104 receives the single chip sequence 410, and identifies the target PN-code 412 in the single chip sequence 410. Note that a transmission error may cause the receiving system 104 to receive a target PN-code that includes transmission errors; Viterbi error correction is used for example to detect and correct such transmission errors.

In step 458, the target PN-code received in step 456 is mapped in reverse direction 403 back to a Viterbi error state 206E as determined by a previous mapping scheme (typically the mapping scheme used in step 452).

In step 460, the Viterbi error state 206E is then sent to the Viterbi decoder 124 (not shown) for processing into output bit 128A in a conventional manner.

Figure 5A:
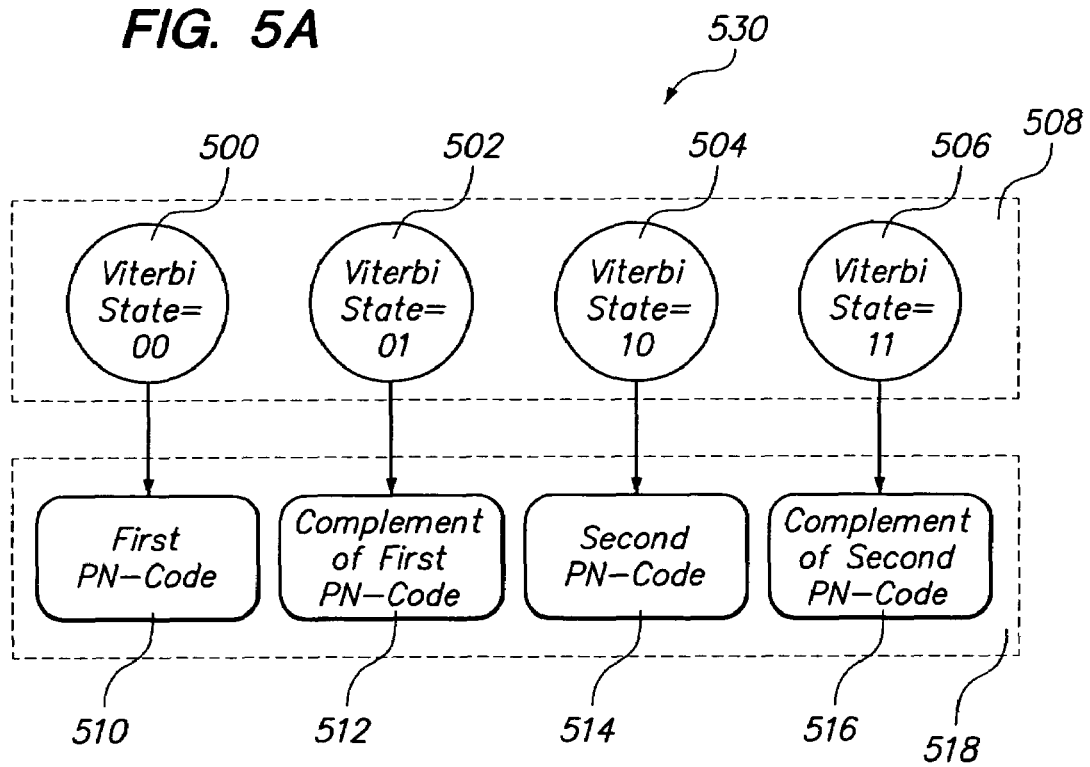
FIGS. 5A-5B are block diagrams illustrating in more detail the mapping of a Viterbi error state 206 to a code group 400, according to some embodiments of the present invention.
Figure 5B:
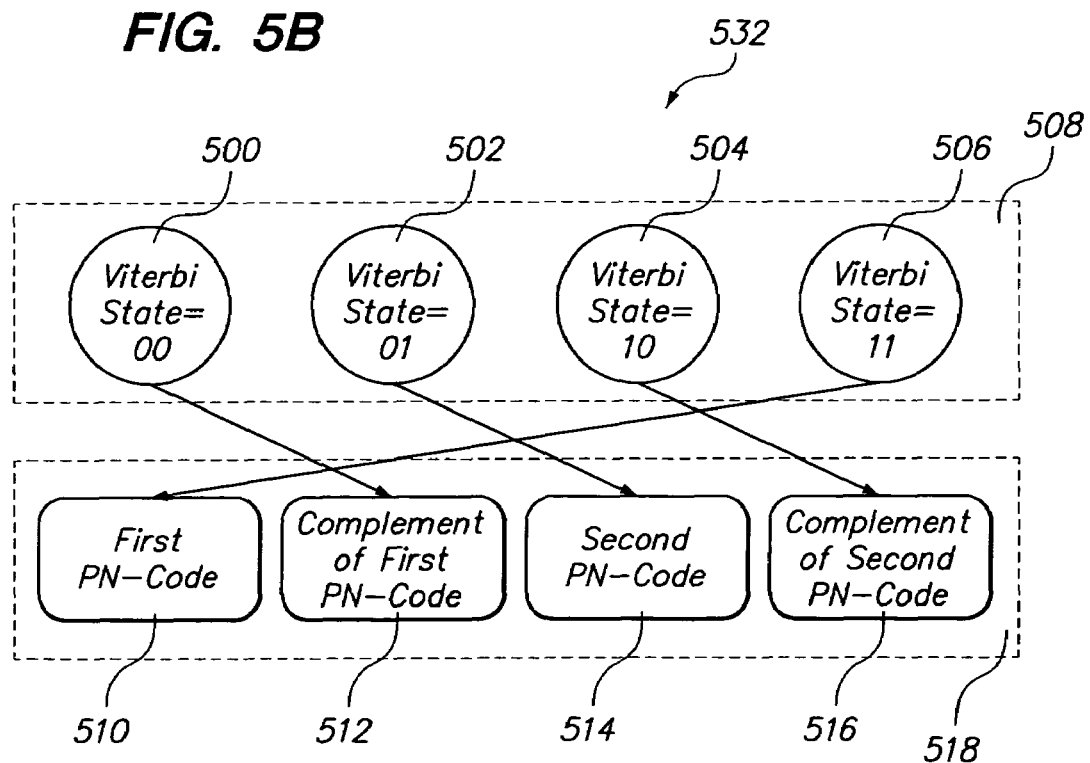

FIGS. 5A-5B are block diagrams illustrating in more detail mapping schemes of a Viterbi error state 206 to a target PN-code in a PN-code group 400, according to some embodiments of the present invention. In FIG. 5A, the use of a Viterbi code rate of ½ requires a 2 bit Viterbi error state for encoding a single input bit 106A; this results in 4 Viterbi error states 500-506 (Viterbi error states=00-11 respectively) constituting the set 508 of all Viterbi error states 508 (in accordance with the Viterbi algorithm). Each of the Viterbi error states 500-506 in the set 508 are mapped to a PN-code 510 or 514, or the complement of a PN-code 512 or 516, in PN-code group 518. Thus, in FIG. 5A, Viterbi error state 500 is mapped to first PN-code 510, Viterbi error state 502 is mapped to the complement 512 of first PN-code 510, Viterbi error state 504 is mapped to the second PN-code 514, and Viterbi error state 506 is mapped to the complement 516 of the second PN-code 514.

In FIG. 5B, a different mapping between Viterbi error states 500-506 and PN-codes 510 and 514, and the complements 512 and 516 of the PN-codes, is illustrated, according to some embodiments of the present invention. Typically, as mappings 530 and 532 (FIGS. 5A-5B respectively) illustrate, each Viterbi error state 500-506 is uniquely mapped to a single PN-code (e.g., 510 or 514) or PN-code complement (e.g., 512 or 516) in the PN-code group 518. As those skilled in the art will appreciate, other mapping variations that preserve a one-to-one correspondence between Viterbi error states 500-506 in the set 508 of Viterbi error states to PN-codes 510 and 514 and PN-code complements 512 and 516 in the PN-code group 518 are possible in other embodiments of the present invention.

Figure 6:
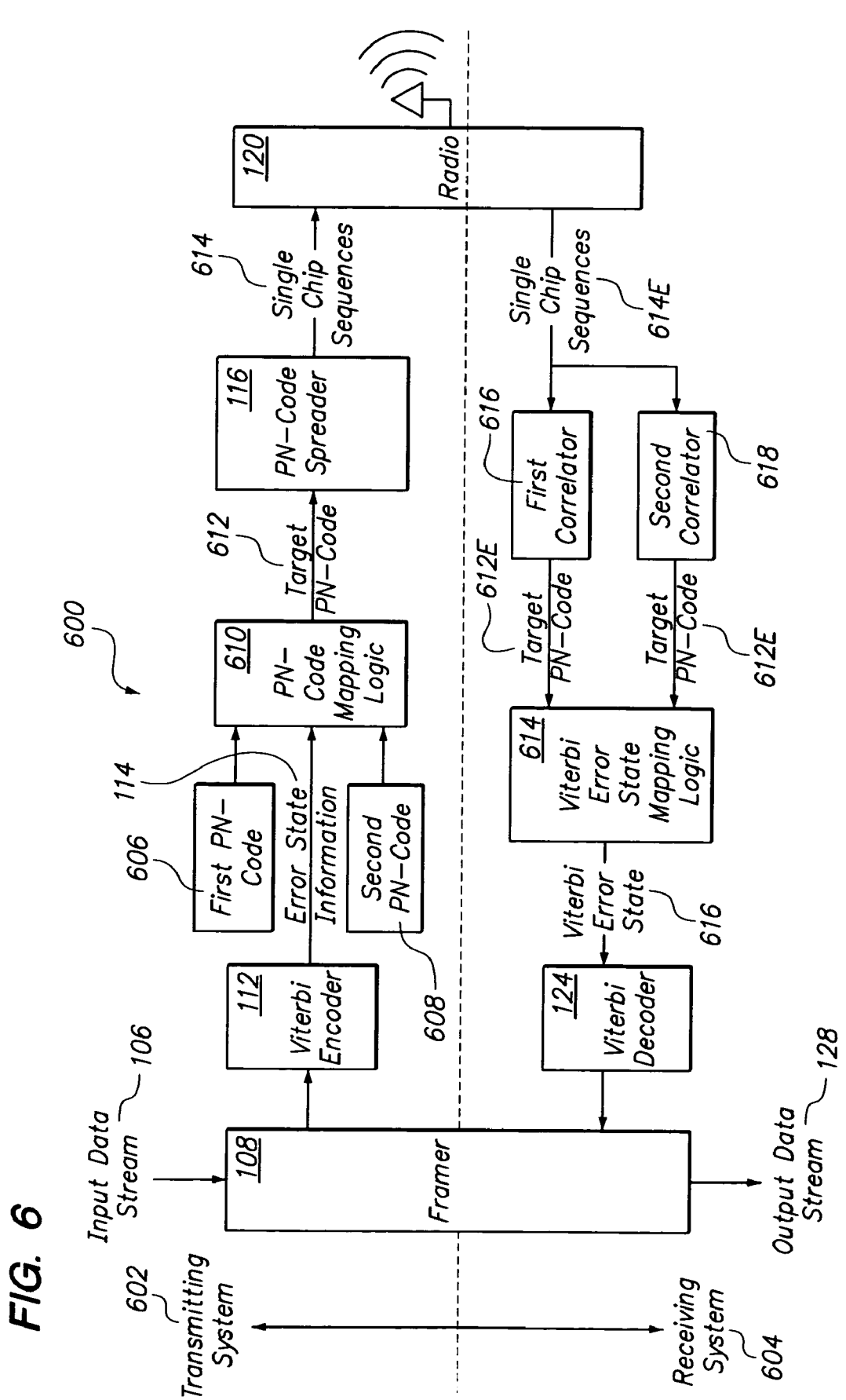
FIG. 6 is a block diagram illustrating a DSSS system 100 using Viterbi error-checking but without the associated Viterbi-related bandwidth penalty, according to some embodiments of the present invention.

FIG. 6 is a block diagram illustrating a DSSS system 600 using Viterbi error-checking but without the associated Viterbi-related bandwidth penalty, according to some embodiments of the present invention. DSSS system 600 is described using a code rate of ½, where the Viterbi encoder 112 generates error state information 114 at the rate of two bits of error state information 114 (i.e., a first symbol 204 and a second symbol 202) for each input bit 106A; each of the 2-bits of error state information constitutes a Viterbi error state.

DSSS system 600 includes transmitting system 602 and receiving system 604. Other embodiments compatible with the present invention DSSS systems may include either transmitting system 602 or receiving system 604, but not both. In transmitting system 602, Viterbi encoder 112 receives input data stream 106 via framer 108. Error state information 114 is sent to PN-code mapping logic 610. PN-code mapping logic 610 maps the Viterbi error states (two bits each) from the stream of error state information 114 into a target PN-code 612. The target PN-code comprises either a first PN-code 606, or the complement (not shown) of the first PN-code 606, or a second PN-code 608, or the complement (not shown) of the second PN-code 608, according to a previously determined mapping scheme (such as mappings 530-532 shown in FIGS. 5A-5B). The target PN-code 612 is then spread by PN-code spreader 116 (i.e., encoded in the single ship sequence 614) and transmitted in the single chip sequence 614 by radio transmitter 120 in a conventional manner.

In the receiving system 604, first correlator 616 and second correlator 618 listen for the single chip sequence 614E encoding the target PN-code 612. Each of the correlators 616 and 618 is configured to listen for one of the PN-codes 606 or 608 and its respective complement. For example, first correlator 616 could be configured to listen for first PN-code 606 and the complement of first PN-code 606, and second correlator 618 could be configured to listen for second PN-code 608 and the complement of second PN-code 608. Thus, for any single chip transmission 614E received, only one of the correlators 616 or 618 will find a match with the target PN-code 612E encoded in the single chip transmission 614E. Correlators 616 and 618 are connected to Viterbi decoder 124 via Viterbi error state mapping logic 614.

Viterbi error state mapping logic 614 receives the target PN-code 612E, and then maps the target PN-code 612E in reverse direction back to the corresponding Viterbi error state 616. Typically, the Viterbi error state mapping logic 614 is configured to perform the previously determined mapping of the PN-Code mapping logic 610, only in reverse direction (from target PN-code to Viterbi state). Viterbi error state mapping logic 614 outputs Viterbi error state 616 to Viterbi decoder 124. It should be noted that Viterbi error state 616 may not correspond to the Viterbi error state sent by the transmitting system 602 due to transmission errors. Viterbi decoder 124 detects errors in the data stream using the stream of Viterbi error states 616, and sends error-corrected data to framer 108 for conventional processing into output data stream 128.

It should be noted that those skilled in the art will recognize after reading this disclosure that the error-checking techniques disclosed herein may be modified to accommodate error states in excess of two bits, and therefore code rates in excess of ½. For example, in the case of a 3-bit Viterbi error state (code rate ⅓), eight Viterbi error states will constitute the set of Viterbi error states in accordance with the Viterbi algorithm. Eight Viterbi error states however may be mapped to a code group that includes four PN-codes and their complements. Code mapping logic 602 in the transmitting system 102 will therefore require modification to map a 3-bit error state to a target PN-code from among a code group of four PN-codes and their complements. Receiving unit 104 will likewise include at least four correlators to listen for the four PN-codes and their complements, and state mapping logic will require modification for mapping the four PN-codes and their complements back to the eight Viterbi error states. It should also be noted that those skilled in the art will additionally recognize that other coding methods beside PN-coding may be used in some embodiments compatible with the present invention. In addition, in one embodiment of the present invention, Gold codes may be used to implement the PN-coding. In other embodiment, Kasami or Walsh codes may be used to implement the PN-coding.

While specific embodiments of the present invention have been provided, it is to be understood that these embodiments are for purposes of illustration and are not to be construed as limiting the claims. Many additional embodiments will be apparent to persons of ordinary skill in the art reading this disclosure. Thus, the present invention is limited only by the following claims.

What is claimed is:

1. A spread spectrum receiver, comprising:
   a first correlator configured to listen for a single chip sequence, the single chip sequence representing at least two symbols of an error state;
   a second correlator configured to listen for the single chip sequence; and
   state mapping logic coupled to the first correlator and the second correlator, the state mapping logic configured to map the at least two symbols from the single chip sequence to the error state after only one of either the first correlator or the second correlator detects a match of the at least two symbols in the single chip sequence.

2. The apparatus of claim 1, wherein each correlator is configured to identify a different code encoded in the single chip sequence.

3. The apparatus of claim 1, wherein the code comprises a PN-code.

4. The apparatus of claim 1, wherein the error state comprises a Viterbi error state.

5. A spread spectrum receiver, comprising:
   logic in the spread spectrum receiver configured to determine an error state from data a received by a single correlator from among a plurality of correlators in a single chip sequence, the data from the single chip sequence comprising a first symbol and a second symbol of the error state for a single bit input signal; and
   means for identifying the error state from a target code, the target code comprising either a code or the complement of the code.

6. The apparatus of claim 5, wherein the code comprises a PN-code.

7. The apparatus of claim 5, wherein the error state comprises a Viterbi error state.

* * * * *